United States Patent [19]

Cash

[11] 4,320,165

[45] Mar. 16, 1982

[54] THICK FILM RESISTOR

[75] Inventor: Michael J. Cash, Philadelphia, Pa.

[73] Assignee: Honeywell Inc., Minneapolis, Minn.

[21] Appl. No.: 960,873

[22] Filed: Nov. 15, 1978

[51] Int. Cl.[3] .......................... B32B 7/02; B05D 5/12; H01C 1/012

[52] U.S. Cl. ...................................... 428/213; 29/620; 338/308; 338/312; 338/314; 427/101; 427/103; 428/426

[58] Field of Search ....................... 428/213, 428, 426; 427/101, 103; 338/308, 312, 314; 29/620

[56] References Cited

U.S. PATENT DOCUMENTS

| | | | |
|---|---|---|---|
| 2,629,166 | 2/1953 | Marsten et al. . | |
| 3,370,262 | 2/1968 | Marty et al. | 338/309 |
| 3,577,276 | 5/1971 | Edge | 427/101 |
| 3,699,650 | 10/1972 | Cocca | 338/308 X |
| 3,743,997 | 7/1973 | Schebalin | 338/49 |
| 3,788,891 | 1/1974 | Schebalin | 428/428 |
| 3,833,407 | 9/1974 | Schebalin | 338/49 X |
| 3,922,388 | 11/1975 | Schebalin | 427/103 |
| 4,104,607 | 8/1978 | Jones | 427/103 X |

*Primary Examiner*—Thomas J. Herbert, Jr.
*Attorney, Agent, or Firm*—Laurence J. Marhoefer; Lockwood D. Burton

[57] ABSTRACT

A unitary thick film resistor structure includes a first thick film resistor element formed on one face of a substrate and a second thick film resistor element formed on the opposite face of the substrate. The resistor elements are of complementary, substantially equal and opposite temperature coefficient of resistance characteristics such that when the two elements are connected in parallel to form a unitary structure, the opposite temperature coefficient characteristics provide a stable, mutually compensated low net temperature coefficient of resistance, and exhibiting an immunity to subsequent baking operations incident to the provision of a sintered protective outer coating.

7 Claims, 4 Drawing Figures

THICK FILM RESISTOR

BACKGROUND OF THE INVENTION

The present invention relates to resistors. More particularly, it relates to improved high precision, thick film resistors.

There has been provided heretofor, a precision thick film resistor such as is shown in U.S. Pat. No. 3,788,891 to Schebalin, and U.S. Pat. No. 3,922,388 also to Schebalin. In those patents there is provided a resistor formed by a blend of resistive paste or ink deposited on a ceramic substrate and fired to sinter the resistive material. A conductive overlay is provided to establish the connector electrodes for the resistive material. The conductive overlay may, itself, be in the form of an ink which is then fired to set the conductive portion. The resistive paste or ink is a blend of a first ink having a positive temperature coefficient of resistance and a second ink having a negative temperature coefficient of resistance. The two inks are blended to produce a net resistance the temperature coefficient of which approaches zero. The resistive material, after firing, is adjusted as by suitable abrasion of the resistive material to bring the resistive value to within the established tolerance for the precision resistor. Following the trimming of the resistor to adjust the resistance value thereof, one or more protective coatings are deposited on the structure to seal the resistive combination from atmospheric chemical contaminants or from mechanical contamination. The protective coating is, in turn, fired to set or cure the protective coating.

While the procedures set forth in the above identified patents do indeed produce a thick film precision resistor, it has been found that the accuracy has been limited to about plus or minus 1% and the temperature coefficient of resistance (TCR) has been, reliably, about plus or minus 25 parts per million per degrees Celsius. It has been speculated that the limitations on the accuracy and the TCR have been a function of the subsequent firing of the resistor elements to make the protective coating.

Accordingly, where the need has been for a higher order of precision with a lower TCR, it has been customary to use wirewound resistors. Such wirewound resistors include two negative characteristics, (1) they are relatively large and bulky and (2) they are substantially more expensive than the thick film resistors.

SUMMARY OF THE INVENTION

Accordingly, it is an object of the present invention to provide an improved thick film precision resistor which obviates the shortcomings of the previous resistors.

It is another object of the present invention to provide an improved resistor as set forth characterized in greater precision and a lower TCR than previous thick film resistors and a lower cost than wirewound resistors.

In accomplishing these and other objects, there has been provided, in accordance with the present invention, a thick film resistor with a first resistor element on one face of a substrate and a second resistor element on the opposite face of the subtrate. The first resistor element is arranged to have a slightly positive TCR while the resistor on the opposite face is designed to have a slightly negative TCR. The conductive electrodes for the resistive elements are so connected that the two resistive elements are effectively connected in shunt with respect to each other and form a unitary resistor structure which has a highly improved characteristic relative to accuracy and TCR and which is not affected by subsequent potting and baking operations.

BRIEF DESCRIPTION OF THE DRAWINGS

A better understanding of the present invention may be had from the following detailed description when read in the light of the accompanying drawing in which.

DETAILED DESCRIPTION

Figure 1:
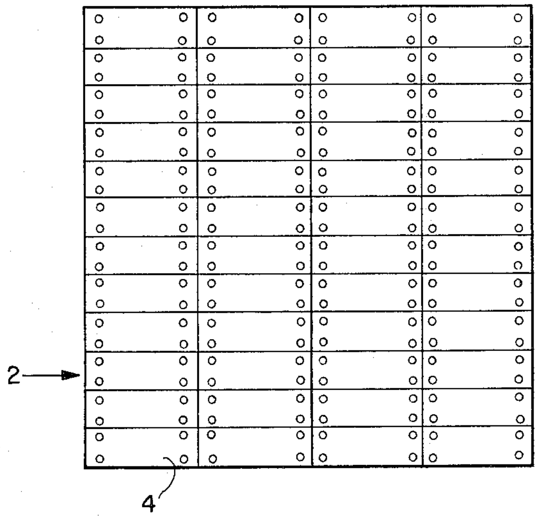
FIG. 1 is a schematic representation of a sheet of substrate on which the resistors are formed.

Referring now to the drawings in more detail, there is shown in FIG. 1 a sheet 2 of ceramic material suitable for a substrate in the formation of a resistance of the type set forth herein. The sheet is scored to provide fracture lines defining each of a plurality of substrate elements 4. Each of the elements is provided with two pairs of perforations at the opposite ends thereof to accommodate the insertion of a lead wire at each end thereof. After the resistors and the correlated conductive elements are coated on the substrate and fired, the substrate may be broken into the individual elements 4.

Figure 2:
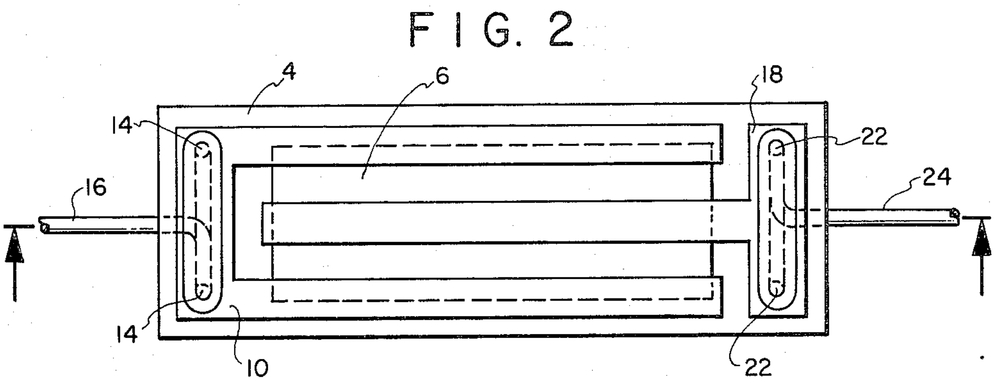
FIG. 2 is a plan view substantially enlarged relative to FIG. 1, of a single resistor element constructed in accordance with the present invention.
Figure 3:
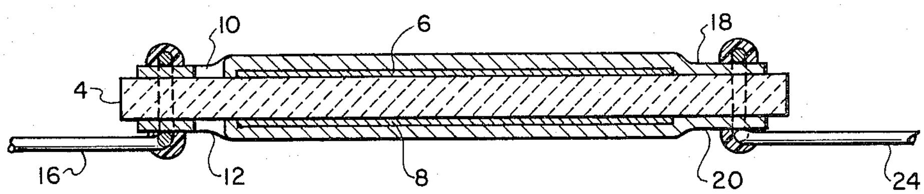
FIG. 3 is a cross-sectional view taken on the line 3—3 of FIG. 2 and viewed in the direction of the appended arrows.

An enlarged view of such an element 4 is shown in FIGS. 2 and 3. The method of forming the resistors is substantially the same as that shown in the aforementioned Schebalin patents. The structure resulting differs from the Schebalin patents in that a resistive element is formed on both major faces of each of the substrate elements. Thus, as shown in FIGS. 2 and 3, a first resistive element 6 is formed on one major face of the substrate element 4 while a second resistive element 8 is formed on the opposite major face of the substrate element. Those resistive elements are then fired in the usual manner to sinter or set the resistive substance. Spaced conductive elements are placed on the substrate overlying the resistive elements to provide electrical contacts for the resistive elements. These conductive layers are also fired to solidify the conductive members.

In the illustrative embodiment, the conductive members are shown as a first member 10 in a substantially U shaped form with the legs of the U embracing the outer edges of the resistive member 6. A similar conductive element 12 is positioned on the opposite side of the substrate and embraces the outer edges of the resistive element 8. The base of the U shaped conductor bridges one end of the substrate element 4 and embraces the two apertures 14 through which a lead wire 16 is connected. The other conductive element 18 is shown as being substantially T shaped and extends down the middle of the resistive element between the legs of the corresponding U shaped conductive element 10 but spaced therefrom. A similar conductive element 20 is positioned on the opposite side of the substrate element 4 and extends down the middle of the resistive element 8 in spaced relation with the U shaped conductor 12. The cross bar at the end of the T shaped sections of the conductive elements 18 and 20 extend across the opposite end of the substrate element 4 and embrace the two apertures 22 through which a lead wire 24 is attached to the structure. The leads 16 and 24 are looped through to engage the respective conductive elements on both sides of the substrate are then solder connected to both sides to assure a good electrical contact to the conductive elements on both sides. While the resistive elements 6 and 8 have been illustrated as being substantially rectangular in form, it will be appreciated that the resistive ink may be held on in any of a number of selected patterns. Similarly, while the two conductive elements have been illustrated, respectively, as U shaped and T shaped, these, too, may be laid on in any of a number of suitable patterns commensurate with the pattern of the resistive elements.

When the resistive elements and the conductive elements have been fired to harden them, the lead wires 16 and 24 may be inserted through the apertures 14 and 22 respectively and soldered to the corresponding conductive elements on both sides of the substrate 4.

In the two Schebalin patents, a mixture of positive and negative temperature coefficient inks were blended to produce a composite resistive ink which had a near zero temperature coefficient. In the present case each resistive element is, again, formed of a mixture of positive and negative temperature coefficient inks but with the distinction that the resistive element 6 which may be designated the prime resistor, $R_p$ is blended to have a slightly positive temperature coefficient resistance while the resistive element 8 is blended to produce a composite ink which has a slightly negative temperature coefficient of resistance. For example, the prime resistor 6 may be formulated to have a TCR of $+5$ to $+10$ parts per million per degrees Celsius and the resistor 8 to have a TCR of minus $-5$ to minus $-10$ parts per million per degrees Celsius.

After the resistors and conductors have been fired, as hereinbefore mentioned, and the leads attached, the resistor 8 is then trimmed by conventional techniques, for example, a very fine air jet carrying abrasive material directed to the resistive element lying between the two conductive elements, to a value substantially twice that of the prime resistor 6. The prime resistor is then trimmed in the same manner to approximate the desired resistance. Alternatively, when the resistive ink is placed on the substrate, the ink or resistive material comprising the resistor 8 may be initially placed in such a way as to be double the resistive value of the resistor 6. The resistor 6 is then trimmed to approximate the desired value for the combination. Typically, the resistor 6 is trimmed to within $-0.25\%$ of the desired value to provide a course adjustment of the combination. The resistor with the higher resistance is then fine trimmed to provide the high order accuracy desired. In resistors constructed in accordance with the present invention, the improved resistors exhibit a calibrated accuracy to + or $-0.05\%$.

Figure 4:
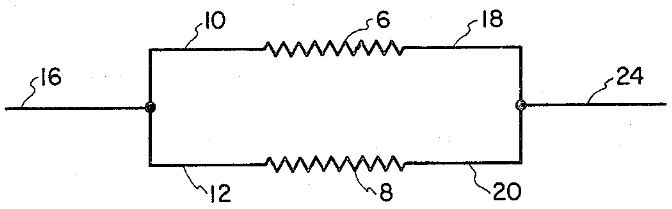
FIG. 4 is an equivalent circuit diagram of the resistor element shown in FIGS. 2 and 3.

As shown in FIG. 4, with the lead wire 16 being solder connected to the conductive elements 10 and 12 on opposite faces of the substrate 4 and with the lead wire 24 being solder connected to the conductors 18 and 20, also on opposite faces of the substrate 4, it is clear that the resistors 6 and 8 are connected in parallel to form a unitary resistance element. With the two resistors thus connected in parallel and of opposite temperature response characteristic, two TCR's effectively sum to substantially approach zero TCR. The net TRC of resistors constructed in accordance with the present invention is reduced to + or $-5$ parts per million per degrees Celsius.

Although the structure has been illustrated on a relatively large scale in the accompanying drawing, this for purposes of clarity, the actual dimensions of resistors constructed in accordance with the present invention are or may be significantly smaller. For example, in one instance, resistors constructed in accordance with the present invention were built on a substrate element 4 which was substantially four millimeters wide by eleven millimeters long. These resistors thus have a TCR which is better than that of wirewound resistors and which are much smaller than a comparable wirewound resistor and significantly less expensive. Additionally, the parallel arrangement of the resistors with their opposite temperature characteristic results in a unitary structure with a significantly improved temperature coefficient of resistance which does not shift significantly when the protection coating is fired. Further, resistors constructed in accordance with the present invention may be made in a wide range of resistance values, for example from 2 ohms to 100 k ohms, at the same order of precision and with the same low TCR.

The embodiments of the invention in which an exclusive property or privilege is claimed are defined as follows:

1. A unitary thick film resistor structure comprising:
a non-conductive substrate member;
a first thick film resistor element formed on a first major face of said substrate member;
a second thick film resistor element formed on a second major face of said substrate member;
said first thick film resistor element having a slightly positive temperature coefficient of resistance;
said second thick film resistor element having a slightly negative temperature coefficient of resistance; and
means connecting said first and second thick film resistor elements in parallel to form a unitary structure wherein said positive and negative temperature coefficients provide mutual compensation and effectively sum to substantially approach zero.

2. A unitary thick film resistor structure comprising:
a ceramic substrate member;
a first thick film resistor element formed on a first major face of said substrate member;
a second thick film resistor element formed on a second major face of said substrate member;
said first thick film resistor element having a slightly positive temperature coefficient of resistance;
said second thick film resistor element having a slightly negative temperature coefficient of resistance;
one of said resistor elements being of substantially twice the resistance value of the other, the resistance elements being trimmed to a desired accuracy; and
means connecting said resistance elements in parallel to form a unitary structure wherein said positive and negative temperature coefficients provide mutual compensation and effectively sum to substantially approach zero.

3. A unitary thick film resistor as set forth in claim 2 wherein said unitary structure is provided with an outer protective coating, the net characteristics of said unitary structure being substantially immune to the coating process due to said mutual compensation.

4. A unitary thick film resistor structure comprising:

a ceramic substrate member;

a first thick film resistor element formed on a first major face of said substrate member;

a second thick film resistor element formed on a second major face of said substrate member;

said first thick film resistor element having a net positive temperature coefficient of resistance on the order of 5 to 10 parts per million per degree Celsius;

said second thick film resistor element having a net negative temperature coefficient of resistance on the order of 5 to 10 parts per million per degree Celsius; and means connecting said first and second thick film resistor elements in parallel to form a unitary structure wherein said positive and negative temperature coefficients provide mutual compensation and effectively sum to a resultant temperature coefficient of resistance on the order of no more than 5 parts per million per degree Celsius.

5. A unitary thick film resistor structure comprising:

a ceramic substrate member;

a first thick film resistor element formed on a first major face of said substrate member;

a second thick film resistor element formed on a second major face of said substrate member;

said first thick film resistor element having a positive temperature coefficient of resistance on the order of 5 to 10 parts per million per degree Celsius;

said second thick film resistor element having a negative temperature coefficient of resistance on the order of 5 to 10 parts per million per degree of Celsius;

one of said resistor element being of substantially twice the resistance value of the other, the resistance elements being trimmed to a desired accuracy;

means connecting said first and second thick film resistor elements in parallel to form a unitary structure wherein said positive and negative temperature coefficients provide a mutual compensation and effectively sum to a resultant temperature coefficient of resistance on the order of no more than 5 parts per million per degree Celsius; and means providing an outer protective coating on said unitary structure, said unitary structure being substantially immune to the coating process due to said mutual compensation.

6. A unitary thick film resistor structure set forth in claim 5 wherein said first thick film resistor element is formed on a blend of resistive pastes having a net, positive temperature coefficient of resistance on the order of 5 to 10 parts per million per degree Celsius;

said second thick film resistor element is formed of a blend of resistive pastes having a net negative temperature coefficient of resistance, and said blends of resistive pastes being sintered on said ceramic substrate.

7. A unitary thick film resistor structure as set forth in claim 6 wherein said protective coating is heat-treated to set said coating material.

* * * * *